United States Patent [19]

Baur et al.

[11] Patent Number: 5,585,216

[45] Date of Patent: Dec. 17, 1996

[54] USE OF CYCLIC OLIGOSACCHARIDES AS CHARGE CONTROL AGENTS

[75] Inventors: Rüdiger Baur, Eppstein; Hans-Tobias Macholdt, Darmstadt, both of Germany

[73] Assignee: Hoechst AG, Germany

[21] Appl. No.: 452,339

[22] Filed: May 26, 1995

[30] Foreign Application Priority Data

May 30, 1994 [DE] Germany .......................... 44 18 842.0

[51] Int. Cl.⁶ ....................................................... G03G 9/97
[52] U.S. Cl. ............................................................ 430/110
[58] Field of Search .................................. 430/106.6, 110

[56] References Cited

U.S. PATENT DOCUMENTS

| 4,656,112 | 4/1987 | Kawagishi et al. | 430/110 |
|---|---|---|---|
| 4,683,188 | 7/1987 | Suzuki et al. | 430/110 |
| 4,684,596 | 8/1987 | Bonser et al. | 430/110 |
| 4,789,614 | 12/1988 | Bugner et al. | 430/110 |
| 4,803,144 | 2/1989 | Hosoi | 430/111 |
| 4,977,052 | 12/1990 | Mikami | 430/111 |
| 5,069,994 | 12/1991 | Gitzel et al. | 430/110 |
| 5,187,038 | 2/1993 | Gitzel et al. | 430/110 |
| 5,281,709 | 1/1994 | Akiyama et al. | 544/348 |
| 5,344,673 | 9/1994 | Hotta et al. | 427/195 |

FOREIGN PATENT DOCUMENTS

| 0469544 | 2/1992 | European Pat. Off. . |
|---|---|---|
| 0476647 | 3/1992 | European Pat. Off. . |
| 0640883A1 | 3/1993 | European Pat. Off. . |
| 0367162 | 1/1995 | European Pat. Off. . |
| 4037518 | 5/1991 | Germany . |
| 4029653 | 3/1992 | Germany . |
| 4321289 | 1/1995 | Germany . |
| 05163449 | 6/1993 | Japan . |
| 5194711 | 8/1993 | Japan . |

OTHER PUBLICATIONS

French, D., et al., "Studies on the Schardinger Dextrins. The preparation and Solubility Characteristics of Alpha, Beta and Gamma Dextrins", *J. Amer. Chem. Soc.* 71: 353–356 (1949).

Singewald, A., et al., "Selectives Trennen von Salzmineralen aufgrund spezifischer Oberflächen–Eigneschaften", *E. Phys. Chem. Neue Folge. Bd.* 124: 223–248 (1981).

Macholdt, H., et al., "Charging Effects of Organic Pigments in Electrophotographic Toners", *Dyes and Pigments* 9:119–127 (1988).

Higashiyama, Y., et al., "The Effect of an Externally Added Charge Control Agent on contact Charging Between Polymers", *J. Electrostatics* 30: 203–213 (1993).

*Patent Abstracts of Japan*, vol. 18, No. 405, p. 1778, Jul. 28, 1994.

*Patent Abstracts of Japan*, vol. 18, No. 412, p. 1780, Aug. 2, 1994.

Database WPI, Week 9335, Derwent Publications Lts. London, GB; AN 94–278344.

*Primary Examiner*—John Goodrow
*Attorney, Agent, or Firm*—Connolly & Hutz

[57] ABSTRACT

Cyclically linked oligo- and polysaccharides having 3 to 100 monomeric saccharide units are used as charge control agents and charging improvers in electrophotographic toners and developers, in powders and powder coatings which can be sprayed triboelectrically or electrokinetically and in electret materials.

15 Claims, No Drawings

USE OF CYCLIC OLIGOSACCHARIDES AS CHARGE CONTROL AGENTS

The present invention relates to the technical field of charge control agents in toners and developers for electrophotographic recording processes, in powders and powder coatings for surface coating, in electret materials, in particular in electret fibers, and in separation processes.

In electrophotographic recording processes, a "latent charge image" is produced on a photoconductor. This "latent charge image" is developed by application of an electrostatically charged toner, which is then transferred, for example, to paper, textiles, films or plastic and fixed, for example by means of pressure, radiation, heat or the action of solvents (L. B. Schein, "Electrophotography and Development Physics"; Springer Series in Electrophysics 14; Springer-Verlag, 1988).

The specific charging q/m (charge per unit mass) of a toner is a measure of its quality. In addition to the sign and level of the electrostatic charging, a decisive quality criterion above all is that the desired charge level is reached quickly and this charge remains constant over a relatively long activation period. Moreover, the insensitivity of the toner to climatic influences, such as temperature and atmospheric humidity, is a further important suitability criterion.

Both positively and negatively chargeable toners are used in copiers and laser printers, depending on the type of process and apparatus.

In order to obtain electrophotographic toners or developers with either positive or negative charging, so-called charge control agents are often added. Since toner binders as a rule show a marked dependency of charging on the activation time, the task of a charge control agent is on the one hand to establish the sign and level of the toner charging, and on the other hand to counteract the charge drift of the toner binder and ensure the toner charging remains constant.

Charge control agents which cannot prevent the toner or developer from displaying a high charge drift over a relatively long period of use (aging), and which may even cause the toner or developer to undergo a charge reversal, are therefore unsuitable in practice.

While black, blue or dark charge control agents can be employed for black toners, charge control agents without an intrinsic color are of particular interest for color toners because of the coloristics.

In the case of full color toners, in addition to the precisely defined color requirements, the three toners yellow, cyan and magenta must also be matched exactly to one another in respect of their triboelectric properties, since they are transferred successively in the same apparatus.

It is known that coloring agents can sometimes have a lasting influence on the triboelectric charging of toners (H.-T. Macholdt, A. Sieber, Dyes & Pigments 9 (1988), 119–127). Because of the different triboelectric effects of coloring agents and of the resulting sometimes very pronounced influence on toner chargeability, it is not possible simply to add the coloring agents to a toner base recipe compiled beforehand. Rather, it may be necessary to compile for each coloring agent its own recipe, for which the nature and amount of the charge control agent required are specially tailor-made.

Since this procedure is very elaborate, highly active colorless charge control agents are necessary which are capable of compensating for the different triboelectric behaviour of various coloring agents and of imparting to the toner the desired charging. In this manner, coloring agents which differ widely in their triboelectric properties can be employed in the various toners required (yellow, cyan, magenta and where appropriate black) using one and the same charge control agent with the aid of a toner base recipe compiled beforehand.

It is furthermore important in practice that the charge control agents have a high heat stability and good dispersibility. Typical temperatures for incorporating charge control agents into toner resins are between 100° C. and 200° C. if kneaders or extruders are used. A heat stability of 200° C., or preferably even 250° C., is accordingly of great advantage. It is also important that the heat stability is ensured over a relatively long period of time (about 30 minutes) and in various binder systems. This is important, since matrix effects which occur again and again lead to premature decomposition of the charge control agents in the toner resin, which means that the toner resin becomes dark yellow or dark brown in color and the charge control effect is completely or partly lost. Typical toner binders are polymerization, polyaddition and polycondensation resins, such as styrene, styrene/acrylate, styrene/butadiene, acrylate, polyester and phenol-epoxy resins, individually or in combination, which can also contain further constituents, such as coloring agents, waxes or flow auxiliaries, or to which these can be subsequently added.

For good dispersibility, it is of great advantage if the charge control agent as far as possible has no waxy properties, no tackiness and a melting or softening point of >150° C., preferably >200° C. Tackiness often leads to problems during metering into the toner formulation, and low melting or softening points may mean that no homogeneous distribution is achieved during dispersion, since the material merges in the form of droplets in the carrier material.

As well as in electrophotographic toners and developers, charge control agents can also be employed for improving electrostatic charging of powders and coatings, in particular in powder coatings sprayed triboelectrically or electrokinetically, such as are used for coating the surfaces of objects of, for example, metal, wood, plastic, glass, ceramic, concrete, textile material, paper or rubber. Powder coating technology is used, for example, for coating objects such as garden furniture, camping articles, domestic appliances, vehicle components, refrigerators and shelving, and for coating workpieces of complicated shape. The powder coating or the powder in general acquires its electrostatic charging by one of the following two processes:

a) in the corona process, the powder coating or the powder is led past a charged corona and is thereby charged, b) in the triboelectric or electrokinetic process, the principle of frictional electricity is used.

The powder coating or the powder acquires an electrostatic charging in a spray apparatus, which charging is opposite to the charge of the frictional partner, in general a hose or spray tube, for example of polytetrafluoroethylene.

A combination of the two processes is also possible. Powder coating resins which are typically employed are epoxy resins, polyester resins containing carboxyl or hydroxyl groups, and polyurethane resins and acrylic resins, together with the customary curing agents. Combinations of resins are also used. Thus, for example, epoxy resins are often employed in combination with polyester resins containing carboxyl or hydroxyl groups. Typical curing agent components for epoxy resins are, for example, acid anhydrides, imidazoles and dicyandiamide and derivatives thereof. Typical curing agent components for polyester resins containing hydroxyl groups are, for example, acid anhydrides, masked isocyanates, bisacylurethanes, phenolic resins and melamine resins. Typical curing agent components for polyester resins containing carboxyl groups are, for example, triglycidyl isocyanurates or epoxy resins. Typical curing agent components used in acrylic resins are, for example, oxazolines, isocyanates, triglycidyl isocyanurates or dicarboxylic acids.

The disadvantage of inadequate charging is to be observed, above all, in powders and powder coatings which are sprayed triboelectrically or electrokinetically and have been prepared on the basis of polyester resins, in particular polyesters containing carboxyl groups, or on the basis of so-called mixed powders, also called hybrid powders. Mixed powders are understood as meaning powder coatings, the resin base of which comprises a combination of epoxy resin and polyester resin containing carboxyl groups. The mixed powders form the basis of the powder coatings occurring most frequently in practice. Inadequate charging of the abovementioned powders and powder coatings means that the deposition rate and throwing power on the material to be coated are inadequate. The term "throwing power" is a measure of the extent to which a powder or powder coating is deposited on the material to be coated, including on reverse sides, hollow cavities, crevices and above all on internal edges and corners.

It has furthermore been found that charge control agents can considerably improve the charging and charge stability behaviour of electret materials, in particular electret fibers (DE-A-43 21 289). Electret fibers have hitherto chiefly been described in connection with the problem of extremely fine dust filtration (for example by Biermann, "Evaluation of permanently charged electrofibrous filters", 17th DOE Nuclear Air Cleaning Conference, Denver, U.S.A., (1982) and in Chemiefasern/Textilindustrie 40/92, (1990/9)). The filter materials described differ both in respect of the materials from which the fibers are made and in respect of the manner in which the electrostatic charge is applied to the fibers. Typical electret materials are based on polyolefins, halogenated polyolefins, polyacrylates, polyacrylonitriles, polystyrenes or fluorine polymers, such as, for example, polyethylene, polypropylene, polytetrafluoroethylene and perfluorinated ethylene and propylene, or on polyesters, polycarbonates, polyamides, polyimides or polyether ketones, on polyarylene sulfides, in particular polyphenylene sulfides, and on polyacetals, cellulose esters, polyalkylene terephthalates and mixtures thereof. Electret materials, in particular electret fibers, can be employed, for example, for (extremely fine) dust filtration. The electret materials can acquire their charge in various ways, in particular by corona or tribo charging.

It is furthermore known that charge control agents can be used in electrostatic separation processes, in particular in processes for separating polymers. Thus, Y. Higashiyama et al. (J. Electrostatics 30, pp 203–212 (1993)) describe how polymers can be separated from one another for recycling purposes using the example of the externally applied charge control agent trimethylphenylammonium tetraphenylborate. Without charge control agents, "low density polyethylene (LDPE)" and "high density polyethylene (HDPE)" become charged essentially similarly by frictional electricity. After addition of charge control agents, LDPE is charged highly positively and HDPE is charged highly negatively, and the two can thus be separated easily. In addition to external application of the charge control agents, incorporation thereof into the polymer is also in principle conceivable, for example in order to shift a polymer within the triboelectric voltage series and to obtain a corresponding separation effect. Other polymers, such as, for example, polypropylene (PP) and/or polyethylene terephthalate (PET) and/or poly-vinyl chloride (PVC) can likewise be separated from one another in this manner.

Salt minerals, for example, can also be separated particularly selectively if a surface additive which improves the substrate-specific electrostatic charging (surface conditioning) has been added to them beforehand, (A. Singewald, L. Ernst, Zeitschrift für Physikal. Chem. New series, Volume 124, pages 223–248 (1981).

Charge control agents furthermore are employed as "electroconductivity providing agents" (ECPA) (JP 05 163 449-A) in inks for ink jet printers.

Numerous charge control agents are known in the literature. However, the charge control agents known to date have a number of disadvantages which severely limit, or even render impossible, their use in practice. Thus, charge control agents such as the heavy metal complexes described in U.S. Pat. No. 4,656,112 or the azines and nigrosines described in U.S. Pat. No. 5,281,709 cannot be employed in colored toners or in white or colored powder coatings because of their intrinsic color.

Ammonium- and immonium-based colorless charge control agents are often sensitive to light or mechanical influences (U.S. Pat. No. 4,683,188) and are unstable to heat, so that they form decomposition products which may have an adverse effect on the triboelectric charging of the toner (U.S. Pat. No. 4,684,596) and/or have an intense, often dark brown, intrinsic color. Furthermore, they are often waxy and sometimes water-insoluble and/or have a low activity as charge control agents.

Charge control agents, which are suitable per se, based on highly fluorinated ammonium and immonium compounds (U.S. Pat. No. 5,069,994) have the disadvantage of an elaborate synthesis, which means that high preparation costs result for the corresponding substances, and are not sufficiently heat-stable.

Charge control agents based on polymeric ammonium compounds U.S. Pat. No. 5,187,038 sometimes lead to the toner or developer having an amine smell, and the charge control properties of these substances can change relatively easily as a result of oxidation and absorption of moisture. Furthermore, the oxidation products are colored and therefore cause trouble above all in color toners. The abovementioned charge control agents for electrophotographic toners and developers are unsuitable for use in the chiefly white or clear powders and powder coatings which are sprayed triboelectrically or electrokinetically, because of their colored nature and their lack of heat stability. A lack of heat stability furthermore severely limits the use of such charge control agents, since powder coatings are stoved, for example, at above 200° C. for 15 minutes. The charge control agents claimed in U.S. Pat. No. 5,069,994 for powders and powder coatings are difficult to handle because of their waxy nature and water-solubility or hygroscopic properties, and can be used only with limitation.

The ammonium compounds described in U.S. Pat. No. 5,069,994 and in U.S. Pat. No. 5,187,036 have the disadvantage of too low a heat stability, incompatibility with specific polyester resin systems, and high cost.

Ammonium salts based on sulfoisophthalic acid and derivatives thereof, as described, for example, in U.S. Pat. No. 4,789,614, in turn have the disadvantage of a low stability in the customary binding systems. Thus, when incorporated into a typical toner binder (styrene/acrylate or polyester) in an amount of 1%, they show significant yellowing after only a few minutes at low temperatures (120° to 140° C.), which renders their use in practice impossible.

The sulfoisophthalic acid resins claimed in U.S. Pat. No. 5,344,673 have the disadvantage of showing a pronounced action only if they are employed as the dominant carrier component, and then lead to systems which have often unstable negative charging. To achieve charge stability or to establish positive charging at all, an additional charge control agent must be added to the binder.

The object of the present invention was therefore to discover improved, particularly active colorless charge control agents. In addition to charging which is achieved rapidly and remains constant, the compounds should have high heat stability (decomposition temperature >200° C.). They should furthermore be readily dispersible, without decomposition, in various toner binders appropriate in practice, such as polyesters, polystyrene-acrylates or polystyrene-butadienes/epoxy resins. Moreover, they should be eco-/toxicologically acceptable, i.e. non-toxic and free from heavy metals. Their action furthermore should be independent of the resin/carrier combination, in order to open up a wide use. They should likewise be readily dispersible, without decomposition, in the usual powder coating binders and electret materials, such as, for example, polyethylenestyrene (PES), epoxide-PES-epoxy hybrid, polyurethane and acrylic systems, and should lead to no discoloration of the resins.

It has now been found, surprisingly, that from the large number of known sugar compounds, certain cyclic oligosaccharides, which are substituted or unsubstituted, have particularly good charge control properties and a high heat stability. These compounds moreover have no intrinsic color and can be dispersed outstandingly in various toner, powder coating and electret binders. They are moreover free from heavy metals and present no toxicological problems, as far as is known.

From the large number of sugar derivatives (saccharides) consisting of a large number of mono-, di- and trisaccharides, open-chain and cyclic oligosaccharides and polysaccharides, such as xanthans, to name only a few, the small group of oligo- and polysaccharides linked in cyclic form, and here in particular those consisting of glucose units, show, in the majority, crystalline behavior, advantageous free-flowing properties and a good heat stability, in contrast to most other sugar derivatives, which are often tacky or readily decomposable.

The present invention relates to the use of oligo- or polysaccharides which are linked cyclically and have 3 to 100 monomeric saccharide units as charge control agents and charging improvers in electrophotographic toners and developers, in powders and powder coatings which can be sprayed triboelectrically or electrokinetically and in electret materials.

Compounds which are preferred in the context of the present invention are 1,4-linked pyranoses of the formula (I)

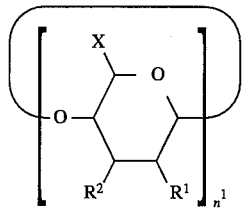

and 1,6-linked pyranoses of the formula (II)

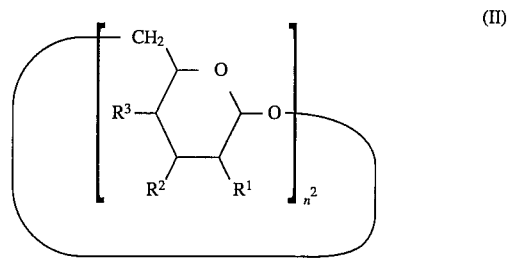

in which
$n^1$ is a number from 6 to 100, preferably 6 to 80, particularly preferably 6 to 60,
$n^2$ is a number from 3 to 100, preferably 3 to 60,
$R^1$, $R^2$ and $R^3$ independently of one another are identical or different and are hydroxyl; branched or unbranched, cyclic or open-chain $C_1$–$C_{30}$-alkoxy; branched or unbranched, cyclic or open-chain $C_2$–$C_{30}$-alkenoxy, preferably vinyloxy or allyloxy, where the alkoxy and alkenoxy radicals mentioned can be partly or completely fluorinated; unsubstituted —O-aryl ($C_6$–$C_{30}$), preferably —O-phenyl, or —O-aryl ($C_6$–$C_{30}$) which is substituted by 1 to 5 $C_1$–$C_{30}$-alkyl radicals or $C_1$–$C_{30}$-alkoxy radicals; —O-(C1–C4)-alkyl-(C6–C30)-aryl; —O-$C_{60}$–$C_{70}$-fullerene; —O-(alkylene($C_0$–$C_{30}$)-Y-alkyl ($C_1$–$C_{30}$))$_x$, —O-(aryl($C_6$–$C_{30}$)-Y-aryl ($C_6$–$C_{30}$))$_x$, —O-(aryl($C_6$–$C_{30}$)-Y-alkyl($C_1$–$C_{30}$))$_x$ or —O-(alkylene($C_0$–$C_{30}$)-Y-aryl($C_6$–$C_{30}$)-alkyl($C_0$–$C_4$))$_x$, where x is 1 to 30, preferably 1 to 2, and Y is a chemical bond, O, S, SO, $SO_2$, $PR^4$, $PR^4_3$, Si, $SiR_2^4$ or $NR^4$, and the radicals $R^4$ are hydrogen, $C_1$–$C_4$-alkyl or $C_1$–$C_4$-alkoxy, preferably a polyoxyethylene and/or polyoxypropylene radical of the formula —O-($C_2$–$C_3$-alkylene-O)$_x$—$R^5$, in which $R^5$ is hydrogen, $C_1$–$C_4$-alkyl, acetyl, benzoyl or naphthoyl; a —O—$COR^6$ radical, in which $R^6$ is OH, saturated or unsaturated, branched or unbranched, cyclic or open-chain $C_1$–$C_{18}$-alkyl, partly fluorinated or perfluorinated ($C_1$–$C_{18}$)-alkyl, phenyl or $C_1$–$C_{18}$-alkyl-phenyl, preferably benzyl or tolyl;

an —O-phosphoryl(—O—$PR^7_2$ and —O—$PR^7_4$) radical, in which $R^7$ is hydrogen, methyl, ethyl, propyl, butyl, vinyl, allyl, isopropyl, isobutyl, neopentyl, tert-butyl, cyclohexyl, cyclopentyl, phenyl, tolyl, benzyl, partly fluorinated or perfluorinated alkyl-($C_1$–$C_{18}$) or O, OH, S or $NR^8_2$, in which $R^8$ is hydrogen, $C_1$–$C_8$-alkyl or phenyl, in particular phosphono ($PO(OH)_2$) and diphenoxyphosphoryl (PO—(O—$C_6H_5$)$_2$); an —O-sulfinyl radical (—O—$SO_2R^9$) in which $R^9$ is methyl, ethyl, propyl, butyl, vinyl, allyl, isopropyl, propyl, isobutyl, neopentyl, tert-butyl, cyclohexyl, cyclopentyl, phenyl, tolyl, benzyl, partly fluorinated or perfluorinated alkyl-($C_1$–$C_{18}$), O, $OR^8$, S or $NR^8_2$;

an —O-silanyl (—O—$SiR^{10}_3$) radical, in which $R^{10}$ is methyl, ethyl, propyl, butyl, vinyl, allyl, isopropyl, isobutyl, neopentyl, tert-butyl, cyclohexyl, cyclopentyl, phenyl, tolyl, partly fluorinated or perfluorinated alkyl($C_1$–$C_{18}$), O, $OR^8$, S or $NR^8_2$;

an —O-boranyl radical (—O—$BR^{11}_2$), in which $R^{11}$ is methyl, ethyl, propyl, butyl, vinyl, allyl, isopropyl, isobutyl, neopentyl, tert-butyl, cyclohexyl, cyclopentyl, phenyl, tolyl, partly fluorinated or perfluorinated alkyl($C_1$–$C_{18}$), O, OH, $OR^8$, S or $NR^8_2$;

a primary (—$NH_2$), secondary (—$NHR^{12}$) or tertiary (—$NR^{12}_2$) amino radical in which $R^{12}$ is hydrogen or a radical of a $C_1$–$C_{30}$-aliphatic, $C_7$–$C_{60}$-araliphatic or $C_6$–$C_{30}$-aromatic hydrocarbon, which can be interrupted by one to 3 hetero atoms N, O and/or S; an alkyl ($C_1$–$C_{18}$), which is perfluorinated or partly fluorinated;

or the N atom of the amino radical is a constituent of a saturated or unsaturated, aromatic or non-aromatic 5- to 7-membered ring system, preferably the piperidinyl or pyridinium ring system, which can contain further hereto atoms, preferably nitrogen, oxygen, sulfur or a combination thereof, in the ring, in particular the morpholinium ring system, and is modified by condensation (fusing on) of or bridging to further ring systems, such as, in particular, the quinolinium ring system;

or an ammonium radical —$NR^{12}_4{}^+A^-$, in which $A^-$ is an inorganic or organic anion;

or an azide radical —$N_3$;

or in which the radicals $R^1$ and $R^2$, or $R^2$, and $R^3$ together form a ring system of the formula

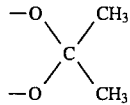

and

X is —$CH_2R^1$, —$CH_2$—$NO_2$ or —$CH_2$—Hal, in which Hal is halogen, preferably —$CH_2OH$, —$CH_2OCH_3$, —$CH_2OCO(C_1$–$C_4)$-alkyl —$CH_2$—O—$SiR_3{}^4$, —$CH_2$—O-trityl, —COOH, —COO($C_1$–$C_4$)alkyl, —$CH_2$—$SO_2$—($C_1$–$C_4$)-alkyl or —$CH_2$—$SO_2$—$C_6H_4$-($C_1$–$C_4$)-alkyl.

Compounds which are of particular interest in the context of the present invention are those of the formulae (I) and (II) in which $R^1$, $R^2$ and $R^3$ independently of one another are hydroxyl, methoxy, ethoxy, propyloxy, iso-propyloxy, n-butyloxy, iso-butyloxy, tert-butyloxy, vinyloxy, allyloxy, phenoxy, benzyloxy, —O—$CF_3$, —O—$(CH_2CH_2$—O$)_x$—$R^5$ or —O—$COR^{13}$, in which $R^{13}$ is a $C_1$–$C_8$-alkyl, phenyl or $C_1$–$C_8$-alkyl-phenyl;

or an amino group —$NR^{14}R^{15}$, in which $R^{14}$ and $R^{15}$ independently of one another are hydrogen, methyl, ethyl, n-propyl, iso-propyl, n-butyl, iso-butyl, tert-butyl, allyl, vinyl, phenyl, benzyl or tolyl, or in which the N atom is a constituent of a piperidinyl, morpholinyl, pyridinium or quinolinium ring system;

or an amino group —$N^\oplus HR^{14}R^{15}A'^\beta$, in which $A'^\beta$ is a borate, sulfate, chloride, bromide, nitrate, cyanide, phosphate, carbonate, acetate or alcoholate anion and X is —$CH_2OH$, —$CH_2OCH_3$, —$CH_2Cl$, —$CH_2Br$, —COOH, —$COOCH_3$, —$CH_2$—O—$C(C_6H_5)_3$, —$CH_2$—O—$Si(CH_3)_3$, —$CH_2$—O—$SO_2$—$CH_3$ or —$CH_2$—O—$SO_2$—$C_6H_4CH_3$.

The oligo- and polysaccharides linked in cyclic form can consist of in each case identical or different monomeric sugar units, it being possible for the differences to be in structure and also in configuration. In particular, the oligo- or polysaccharide can contain those monomeric sugar units which are enantiomeric or diastereomeric with respect to one another.

Cyclic oligo- and polysaccharides which consist of in each case identical or enantiomeric saccharide units or of enantiomeric mixtures of these units (racemate), in which the radicals $R^1$, $R^2$, $R^3$ and X are in each case identical, are preferred in the context of the present invention.

Mixtures or mixed crystals of various cyclically linked oligo- or polysaccharides and mixtures of various cyclically linked oligosaccharide enantiomers and racemates are furthermore of interest.

Mixtures or mixed crystals of various cyclically linked oligosaccharides, also in their ionic form, and mixtures of various cyclically linked oligosaccharide enantiomers and racemates are furthermore of interest.

1,4-Linked oligoglucosides or oligolactosides having 6 to 8 monomeric units, in which $R^1$, $R^2$ and $R^3$ are in each case OH, $OCH_3$, $OC_2H_5$, $OC_3H_7$, O-n-butyl, O-iso-butyl, O-tert-butyl, O-mesyl or O-tosyl and X is —$CH_2OH$, —$CH_2OCH_3$, —$CH_2O$-tosyl or —$CH_2O$-mesyl are particularly preferred in the context of the present invention.

Cyclically linked oligoglucosides are called cyclodextrins in the literature. The designation alpha-, beta- and gamma-cyclodextrin depends on the number of cyclically linked saccharide monomers. An oligosaccharide 1,4-linked cyclically consisting of 6 saccharide monomers ($n^1$=6) is called alpha-cyclodextrin, one consisting of 7 saccharide monomers ($n^1$=7) is called beta-cyclodextrin and one consisting of 8 saccharide monomers ($n^1$=8) is called gamma-cyclodextrin. For the higher homologs, the nomenclature continues correspondingly according to the Greek alphabet. 1,4-linked homologs with n<6 are unknown, since cyclization is not possible for steric reasons, but 1,6-linked homologs where $n^2$=3, 4 and 5 are known.

The following 1,4-linked cyclodextrins of the formula (I) are of special interest:

Compound 1: $R^1$ and $R^2$ are OH, X is $CH_2OH$, $n^1$ is 6;

Compound 2: $R^1$ and $R^2$ are OH, X is $CH_2OH$, $n^1$ is 7;

Compound 3: $R^1$ and $R^2$ are OH, X is $CH_2OH$, $n^1$ is 8;

Compound 4: $R^1$ and $R^2$ are OH, X is $CH_2$—O—$SO_2$—$CH_3$, $n^1$ is 7;

Compound 5: $R^1$ and $R^2$ are OH, X is $CH_2$—O—$SO_2$—$C_6H_4CH_3$, $n^1$ is 7;

Compound 6: $R^1$ and $R^2$ are acetyl, X is $CH_2$—$OCOCH_3$, $n^1$ is 7;

Compound 7: $R^1$ and $R^2$ are acetyl, X is $CH_2$—$OCOCH_3$, $n^1$ is 6;

Compound 8: $R^1$ and $R^2$ are —O—$Si(CH_3)_3$, X is $CH_2$—O—$Si(CH_3)_3$, $n^1$ is 7;

Compound 9: $R^1$ and $R^2$ are OH, X is $CH_2$—O—$C(C_6H_5)_3$, $n^1$ is 7;

Compound 10: $R^1$ and $R^2$ are $OCH_3$, X is $CH_2$—$OCH_3$, $n^1$ is 7;

and in each case their enantiomers and mixtures with one another.

The preparation of the cyclically linked oligo- and polysaccharides is described many times in the literature. (Beilstein "Handbuch der Organischen Chemie (Handbook of Organic Chemistry); Syst. No. 3011, 5th Supplement Volume 19/12; Angew Chem. 92 (1980) 343, D. French, M. L. Levine, J. H. Pazur, E. Norberg J. Am. Chem. Soc. 71 (1949) 353.) In a typical variant, the synthesis of the cyclic oligosaccharides is carried out by reaction of starch with cultures of *Bacillus macerans*. The individual cyclic systems can be separated from the mixture by fractional crystallization or by chromatographic methods. Individual derivatives are now already commercially obtainable. They are marketed under the name alpha-, beta- or gamma-cyclodextrin or Schardinger dextrins. The variously substituted compounds are typically prepared by specifications known from the literature from the cyclic oligosaccharides (X=$CH_2OH$ and $R^1$/$R^2$=OH) by derivatization with suitable reagents (Angew. Chem. 103 (1991) 94, Angew. Chem. 1994 (106), 851).

The derivatives described were prepared by methods described in Chem. Ber. 102 (1969) 494–498. The melting points were determined for identification.

In addition to the 1,4-linkage as shown in formula (I), other ring linkages are also possible (Angew. Chem. 1994, 106, page 363), which also allow smaller rings, for example n=3. In this case, derivatization is essentially carried out via monomeric units before the cyclization.

The compounds according to the invention are colorless and have particularly high and constant charge control properties, good stabilities and very good dispersibilities. A great technical advantage of these very readily dispersible compounds lies in the fact that they are inert toward the various binder systems and thus have diverse uses. In addition to their suitability in toners, they are also particularly suitable as charge control agents and charge improvers in powders and coatings, in particular powder coatings, especially since they do not adversely influence (accelerate) the gelling time during thermal crosslinking of the powder coatings ("stoving").

The high activity, the excellent heat stability and the general resin compatibility are of special advantage to the compounds according to the invention. The very good dispersibility is particularly important for industrial use, so that overall a high efficiency can be achieved. Furthermore, they are free from heavy metals and are toxicologically acceptable.

It is a particular property of all cyclic oligomers that they both adsorb water molecules and embed them in the cavity of the ring. In addition to increasing the temperature, various methods such as vacuum (high vacuum) and/or physically or chemically acting agents with a high adsorption of water, such as molecular sieves and/or perchlorates, are therefore necessary to remove the correspondingly bonded water. Overall, a wide range of water content can therefore be used on the basis of the variously bonded water.

The cyclically linked oligo- and polysaccharides which are employed according to the invention have the following chemical/physical properties:

1. The water content, determined by the Karl-Fischer method, is between 0.001% and 30%, preferably between 0.01 and 25% and particularly preferably between 0.1 and 20%, it being possible for the water to be adsorbed and/or bonded and for its content to be adjusted by the action of heat up to 200° C. and vacuum to $10^{-8}$ mm Hg or by addition of water.
2. The particle size, determined by means of the Coulter counter method or laser light diffraction and defined by the $d_{50}$ value, is between 0.01 µm and 3000 µm, preferably between 0.1 and 1000 µm and especially preferably between 0.5 and 500 µm.
3. The dielectric properties, characterized by:
   a) the volume resistivity, determined at 1 kHz, of between $1 \times 10^7$ ohm×cm and $9 \times 10^{16}$ ohm×cm, preferably between $1 \times 10^8$ ohm×cm and $9 \times 10^{15}$ ohm×cm;
   b) the dielectric loss factor tan delta, determined at 1 kHz, of between $9 \times 10^{-1}$ and $1 \times 10^{-3}$, preferably between $5 \times 10^{-1}$ and $5 \times 10^{-3}$, and
   c) a relative permittivity epsilon of between 1 and 20, preferably between 3 and 15.
4. The crystallinity of the compounds, determined by the X-ray diffraction method, is highly crystalline to partly crystalline and also amorphous to X-rays and
5. The heat stability, determined by means of differential thermal analysis with a constant heating rate of 3 K/minute, is greater than 200° C.

With the abovementioned compounds 1, 2 and 3, without being limited to these, it can be demonstrated in test toners that the addition of 1% by weight of the compounds mentioned can direct the triboelectric chargeability in very small steps as a function of time. For the triboelectric tests, the results of which are summarized in the following Table 1, the designations have the following meanings:

I) Toner binder:
   Resin 1: styrene/methacrylate copolymer 60:40
   Resin 2: polyester based on bisphenol II) Carrier:
   Carrier 1: Magnetite particles of size 50 to 200 µm coated with styrene/methacrylate copolymer 90:10 (90 µm Xerographic Carrier, Plasma Materials Inc., U.S.A.).
   Carrier 2: Magnetite particles of size 50 to 100 µm coated with silicone (bulk density 2.75 g/cm$^3$) (FBM 96-110; Powder Techn.)
   Carrier 3: Magnetite particles of size 50 to 200 µm coated with styrene/methacrylate copolymer (bulk density 2.62 g/cm$^3$) (FBM 100 A; Powder Techn.).

Table 1: q/m values [µC/g], determined as a function of time, of some cyclically linked oligosaccharides, 1% strength, dispersed in the toner binder and activated with carriers. min means minutes and h means hours (atmospheric humidity 40 to 60%)

| Compound | Use Example | 10 min | 30 min | 2 h | 24 h |
|---|---|---|---|---|---|
| A) Resin 1/Carrier 1 | | | | | |
| 1 | 1 | −23 | −29 | −34 | −42 |
| 2a | 2 | −19 | −28 | −35 | −42 |
| 2b | 26 | −22 | −25 | −27 | −36 |
| 3 | 3 | −20 | −28 | −35 | −47 |
| B) Resin 1/Carrier 2 | | | | | |
| 1 | 4 | −13 | −19 | −28 | −47 |
| 2a | 5 | −12 | −18 | −28 | −44 |
| 2b | 27 | −12 | −18 | −24 | −32 |
| 3 | 6 | −12 | −20 | −32 | −47 |
| C) Resin 2/Carrier 2 | | | | | |
| 1 | 7 | −23 | −35 | −37 | −38 |
| 2a | 8 | −16 | −19 | −20 | −22 |
| 2b | 28 | −15 | −15 | −16 | −16 |
| 3 | 9 | −16 | −18 | −20 | −26 |
| D) Resin 1/Carrier 3 | | | | | |
| 1 | 10 | −13 | −18 | −21 | −24 |
| 2a | 11 | −11 | −19 | −22 | −25 |
| 2b | 29 | −16 | −21 | −22 | −22 |
| 3 | 12 | −10 | −15 | −18 | −20 |

TABLE 2 q/m values [µC/g], determined as a function of time, of some cyclically linked oligosaccharides, 1% strength, dispersed in the toner binder and activated with carrier 3. min means minutes and h means hours (atmospheric humidity 90% and 20%)

| Compound | Use Example | 10 min | 30 min | 2 h | 24 h |
|---|---|---|---|---|---|
| A) Resin 1/Carrier 3 (90% atmospheric humidity) | | | | | |
| 1 | 20 | −13 | −19 | −21 | −22 |
| 2a | 22 | −11 | −19 | −22 | −22 |
| 2b | 30 | −14 | −22 | −23 | −21 |
| 3 | 24 | −9 | −15 | −19 | −20 |
| B) Resin 1/Carrier 3 (20% atmospheric humidity) | | | | | |
| 1 | 21 | −11 | −17 | −19 | −22 |
| 2a | 23 | −14 | −23 | −25 | −26 |
| 2b | 31 | −13 | −19 | −21 | −22 |
| 3 | 25 | −9 | −15 | −18 | −23 |

The studies at different atmospheric humidities additionally demonstrate the high efficiency of the compounds, which is independent of environmental influences and therefore constitutes a particular advantage of the compounds according to the invention. The reason for this is evidently to be found in the particular cyclic structure, which, in addition to the high heat stability and very good dispersing properties, results in a particular moisture storage and buffer capacity. Since electrostatic charging usually reacts very sensitively to traces of moisture, it is very surprising that these compounds act so efficiently over a very wide range of intrinsic moisture (compound 2). They can therefore also additionally be employed as a moisture regulator in the toners and binder systems claimed.

negative charging (Use Example 1), in comparison with the not very fast and not very constant chargeability of the pure toner binder (Comparison Example 1).

The high efficiency becomes particularly clear in comparison with other polysaccharides. Thus, xanthans having molecular weights of about 2 million which are formed from β-1,4-bonded glucose units (formula IV: Römpp, 9th edition, Volume 6, page 5075)

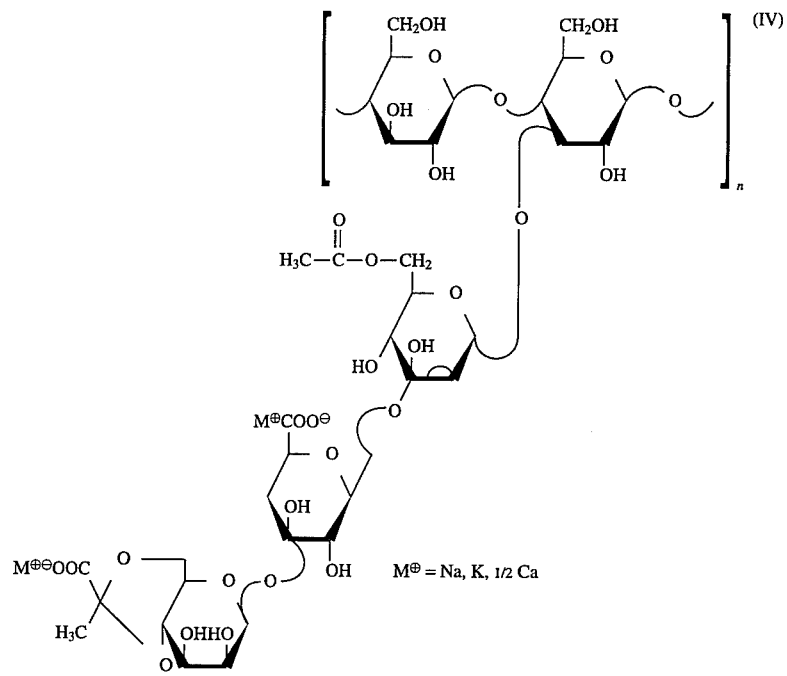

Basic unit of xanthan

TABLE 3 q/m values [μC/g], determined as a function of time, of some cyclically linked oligosaccharides, 1% strength, dispersed in the toner binder and activated with carrier 3. min means minutes and h means hours (atmospheric humidity 40 to 60%)

| Compound | Use Example | 10 min | 30 min | 2 h | 24 h |
|---|---|---|---|---|---|
| A) Resin 1/Carrier 3 | | | | | |
| 1 | 13 | −1 | −3 | −5 | −14 |
| 5 | 14 | −1 | −1 | −4 | −19 |
| 6 | 15 | −2 | −4 | −6 | −14 |
| 7 | 16 | −2 | −4 | −5 | −8 |
| 8 | 17 | −1 | −2 | −5 | −16 |
| 9a | 18 | −1 | −3 | −7 | −20 |
| 10 | 19 | −8 | −15 | −21 | −17 |

Tables 1 to 3 demonstrate the high efficiency of the compounds according to the invention. The triboelectric control surprisingly remains almost independent of the resin/carrier combination. Low concentrations already have a significant influence. Thus, for example, a test toner containing 1% by weight of compound 1 shows a constant negative charging (Use Example 1), in comparison with the show no efficiency at all and only a low heat stability. Thus, a xanthan having the commercial name ®Rhodopol (Rhone Poulenc), incorporated into resin 1 in an amount of 1% and activated with carrier 3, shows a charging of −1 μC/g after 10 minutes, a charging of −3 μC/g after 30 minutes, a charging of −7 μC/g after 2 hours and a charging of −17 μC/g after 24 hours (Comparison Example: 5).

A 1% strength test toner of the above composition already starts to discolor significantly to brown at 150° C., which is evidence of the low heat stability, while a test toner containing, for example, compound 1 still remains completely clear, i.e. transparent, above 200° C. and shows no discoloration caused by decomposition.

A significant improvement in chargeability and the associated higher deposition rate can also be clearly seen in powder coating binders. While the pure powder coating binder has virtually no chargeability (0.9–1.2 μA) and associated therewith a very low deposition rate of (28%) (Comparison Example 4), the chargeability can be improved to 2.5–3.1 μA and the deposition rate to 82% by addition of 1% by weight of compound 1 (Use Example 32). Because of the high transparency of the coating in the molten and completely cured state, the compounds employed according to the invention are also particularly suitable for powder coatings.

The cyclic oligosaccharides mentioned are also suitable for use in electret materials.

The compounds used according to the invention are incorporated homogeneously, for example by extrusion or kneading, individually or in combination with one another, into the binder of the particular toner, developer, coating, powder coating, electret material or polymer to be separated electrostatically in a concentration of 0.01 to 50% by weight, preferably 0.5 to 20% by weight, particularly preferably 0.1 to 5.0% by weight, based on the total mixture. The compounds employed according to the invention can be added here as dried and ground powders, dispersions or solutions, press-cakes, masterbatches, preparations or mixed pastes, as compounds adsorbed onto suitable carriers, such as, for example, silica gel, $TiO_2$ or $Al_2O_3$, from an aqueous or non-aqueous solution, or in another form. The compounds used according to the invention can likewise also in principle already be added during preparation of the particular binders, i.e. in the course of the polymerization, polyaddition or polycondensation thereof.

The present invention also relates to an electrophotographic toner, powder or powder coating comprising a customary toner binder, for example a polyester or acrylic resin containing epoxide, carboxyl or hydroxyl groups, or a combination thereof, and 0.01 to 50% by weight, preferably 0.5 to 20% by weight, particularly preferably 0.1 to 5% by weight, of at least one cyclically linked oligo- or polysaccharide.

In the case of electrostatic separation operations on polymers, and in particular on (salt) minerals, the charge control agents can also be applied externally, i.e. to the surface of the materials to be separated, in the abovementioned amounts.

The level of electrostatic charging of the electrophotographic toners or of the powder coatings into which the charge control agents according to the invention are incorporated homogeneously cannot be predicted and is measured on standard test systems under identical conditions (same dispersing time, same particle size distribution, same particle shape) at about 20° C. and 50% relative atmospheric humidity. Electrostatic charging of the toner is carried out by vortexing with a carrier, i.e. a standardized friction partner (3 parts by weight of toner per 97 parts by weight of carrier), on a roller bench (150 revolutions per minute). The electrostatic charging is then measured on a customary q/m measurement stand (J. H. Dessauer, H. E. Clark, "Xerography and Related Processes", Focal Press, N.Y., 1965, page 289; J. F. Hughes, "Electrostatic Powder Coating", Research Studies Press Ltd. Letchworth, Hertfordshire, England, 1984, Chapter 2). The particle size has a great influence when determining the q/m value or the tribo-charging of powder coatings, and for this reason a uniform particle size distribution is strictly ensured in the toner samples or powder coating samples obtained by sifting. An average particle size of 10 μm is aimed for in the case of toners, while an average particle size of 50 μm is practicable for powder coatings.

Triboelectric-spraying of the powder (coatings) is carried out with a spray apparatus having a standard spray tube and a star-shaped insert at maximum powder throughput with a spray pressure of 3 bar. For this purpose, the object to be sprayed is suspended in a spray booth and sprayed directly from the front from a distance of about 20 cm without further movement of the spray apparatus. The particular charging of the powder sprayed on is then measured with a "measuring instrument for measuring the triboelectric charge of powders" from Intec (Dortmund). For the measurement, the measuring antenna of the measuring instrument is held directly in the cloud of powder emerging from the spray apparatus. The current strength resulting from the electrostatic charge of the powder coating or powder is displayed in μA. The deposition rate is then determined in % by obtaining the difference in weight between the powder coating sprayed on and that deposited.

In the following examples, "min" means "minutes" and "h" means "hours".

USE EXAMPLE 1

1 part of compound I is incorporated homogeneously into 99 parts of a toner binder (styrene/methacrylate copolymer 60:40) by means of a header in the course of 45 min. The mixture is then ground on a laboratory universal mill and subsequently classified on a centrifugal sifter. The desired particle fraction (4 to 25 μm) is activated with a carrier (carrier 1), which comprises magnetite particles of size 50 to 200 μm coated with styrene/methacrylate copolymer 90:10 (90 μm Xerographic Carrier, Plasma Materials Inc., U.S.A.).

Measurement is carried out on a customary q/m measurement stand. By using a sieve having a mesh width of 25 μm, it is ensured that no carrier is entrained when the toner is blown out. The measurements are carried out at 50% relative atmospheric humidity. The following q/m values [μC/g] are measured as a function of the activation time:

| Activation time | Charging q/m [μC/g] |
| --- | --- |
| 10 min | −23 |
| 30 min | −29 |
| 2 h | −34 |
| 24 h | −42 |

USE EXAMPLE 2

As described in Use Example 1, 1 part of compound 2a is incorporated and the charge is measured.

| Activation time | Charging q/m [μC/g] |
| --- | --- |
| 10 min | −19 |
| 30 min | −28 |
| 2 h | −35 |
| 24 h | −42 |

USE EXAMPLE 3

As described in Use Example 1, 1 part of compound 3 is incorporated and the charge is measured.

| Activation time | Charging q/m [μC/g] |
| --- | --- |
| 10 min | −20 |
| 30 min | −28 |
| 2 h | −35 |
| 24 h | −47 |

USE EXAMPLE 4

1 part of compound 1 is incorporated homogeneously into 99 parts of a toner binder (styrene/methacrylate copolymer 60:40) by means of a kneader in the course of 45 min. The mixture is then ground on a laboratory universal mill and subsequently classified on a centrifugal sifter. The desired particle fraction (4 to 25 is activated with a carrier (carrier 2) which comprises magnetite particles of size 50 to 200 μm coated with silicone (bulk density 2.75 g/cm³); (FBM 96-110; Powder Techn.).

Measurement is carried out on a customary q/m measurement stand. By using a sieve having a mesh width of 25 μm, it is ensured that no carrier is entrained when the toner is blown out. The measurements are carried out at 50% relative atmospheric humidity. The following q/m values [μC/g] are measured as a function of the activation time:

| Activation time | Charging q/m [μC/g] |
| --- | --- |
| 10 min | −13 |
| 30 min | −19 |
| 2 h | −28 |
| 24 h | −47 |

USE EXAMPLE 5

As described in Use Example 4, 1 part of compound 2a is incorporated and the charge is measured.

| Activation time | Charging q/m [μC/g] |
| --- | --- |
| 10 min | −12 |
| 30 min | −18 |
| 2 h | −28 |
| 24 h | −44 |

USE EXAMPLE 6

As described in Use Example 4, 1 part of compound 3 is incorporated and the charge is measured.

| Activation time | Charging q/m [μC/g] |
| --- | --- |
| 10 min | −12 |
| 30 min | −20 |
| 2 h | −32 |
| 24 h | −47 |

USE EXAMPLE 7

1 part of compound 1 is homogeneously incorporated into 99 parts of a toner binder (polyester based on bisphenol) by means of a header in the course of 45 min. The mixture is then ground on a laboratory universal mill and subsequently classified on a centrifugal sifter. The desired particle fraction (4 to 25 μm) is activated with a carrier (carrier 2) which comprises magnetite particles of size 50 to 200 μm coated with silicone (bulk density 2.75 g/cm³); (FBM 96-100; Powder Techn.).

Measurement is carried out on a customary q/m measurement stand. By using a sieve having a mesh width of 25 μm, it is ensured that no carrier is entrained when the toner is blown out. The measurements are carried out at 50% relative atmospheric humidity. The following q/m values [μC/g] are measured as a function of the activation time:

| Activation time | Charging q/m [μC/g] |
| --- | --- |
| 10 min | −23 |
| 30 min | −35 |
| 2 h | −37 |
| 24 h | −38 |

USE EXAMPLE 8

As described in Use Example 7, 1 part of compound 2 is incorporated and the charge is measured.

| Activation time | Charging q/m [μC/g] |
| --- | --- |
| 10 min | −16 |
| 30 min | −19 |
| 2 h | −20 |
| 24 h | −22 |

USE EXAMPLE 9

As described in Use Example 7, 1 part of compound 3 is incorporated and the charge is measured.

| Activation time | Charging q/m [μC/g] |
| --- | --- |
| 10 min | −16 |
| 30 min | −18 |
| 2 h | −20 |
| 24 h | −26 |

USE EXAMPLE 10

1 part: of compound 1 is homogeneously incorporated into 99 parts of a toner binder (styrene/methacrylate copolymer 60:40) by means of a header in the course of min. The mixture is then ground on a laboratory universal mill and subsequently classified on a centrifugal sifter. The desired particle fraction (4 to 25 μm) is activated with a carrier (carrier 3) which comprises magnetite particles of size 50 to 200 μm coated with styrene/methacrylate copolymer (bulk density 2.62 g/cm³); (FBM 100 A; Powder Techn.).

Measurement is carried out on a customary q/m measurement stand. By using a sieve having a mesh width of 25 μm, it is ensured that no carrier is entrained when the toner is blown out. The measurements are carried out at 50% relative atmospheric humidity. In this case, 2% of the toner is measured as a mixture with 98% of carrier 3.

| Activation time | Charging q/m [μC/g] |
| --- | --- |
| 10 min | −13 |
| 30 min | −18 |
| 2 h | −21 |
| 24 h | −24 |

USE EXAMPLE 11

As described in Use Example 10, 1 part of compound 2a is incorporated and the charge is measured.

| Activation time | Charging q/m [μC/g] |
| --- | --- |
| 10 min | −11 |
| 30 min | −19 |
| 2 h | −22 |
| 24 h | −25 |

USE EXAMPLE 12

As described in Use Example 10, 1 part of compound 3 is incorporated and the charge is measured.

| Activation time | Charging q/m [µC/g] |
|---|---|
| 10 min | −10 |
| 30 min | −15 |
| 2 h | −18 |
| 24 h | −20 |

USE EXAMPLE 13

As described in Use Example 10, 1 part of compound 4 is incorporated and the charge is measured.

| Activation time | Charging q/m [µC/g] |
|---|---|
| 10 min | −1 |
| 30 min | −3 |
| 2 h | −5 |
| 24 h | −14 |

USE EXAMPLE 14

As described in Use Example 10, 1 part of compound 5 is incorporated and the charge is measured.

| Activation time | Charging q/m [µC/g] |
|---|---|
| 10 min | −1 |
| 30 min | −1 |
| 2 h | −4 |
| 24 h | −19 |

USE EXAMPLE 15

As described in Use Example 10, 1 part of compound 6 is incorporated and the charge is measured.

| Activation time | Charging q/m [µC/g] |
|---|---|
| 10 min | −2 |
| 30 min | −4 |
| 2 h | −6 |
| 24 h | −14 |

USE EXAMPLE 16

As described in Use Example 10, 1 part of compound 7 is incorporated and the charge is measured.

| Activation time | Charging q/m [µC/g] |
|---|---|
| 10 min | −2 |
| 30 min | −4 |
| 2 h | −5 |
| 24 h | −8 |

USE EXAMPLE 17

As described in Use Example 10, 1 part of compound 8 is incorporated and the charge is measured.

| Activation time | Charging q/m [µC/g] |
|---|---|
| 10 min | −1 |
| 30 min | −2 |
| 2 h | −5 |
| 24 h | −16 |

USE EXAMPLE 18

As described in Use Example 10, 1 part of compound 9 is incorporated and the charge is measured.

| Activation time | Charging q/m [µC/g] |
|---|---|
| 10 min | −1 |
| 30 min | −3 |
| 2 h | −7 |
| 24 h | −20 |

USE EXAMPLE 19

As described in Use Example 10, 1 part of compound 10 is incorporated and the charge is measured.

| Activation time | Charging q/m [µC/g] |
|---|---|
| 10 min | −8 |
| 30 min | −15 |
| 2 h | −21 |
| 24 h | −17 |

USE EXAMPLE 20

As described in Use Example 10, 1 part of compound 1 is incorporated. The 1% strength toner is mixed with the carrier, and before measurement, the mixture is exposed to 90% atmospheric humidity in a climatically controlled chamber for up to 48 h, charged by frictional electricity as a function of time in a closed activating unit in isolation from the ambient humidity, and measured.

| Activation time | Charging q/m [µC/g] |
|---|---|
| 10 min | −13 |
| 30 min | −19 |
| 2 h | −21 |
| 24 h | −22 |

USE EXAMPLE 21

As described in Use Example 20, 1 part of compound 1 is incorporated and the charge is measured at an atmospheric humidity of 20%.

| Activation time | Charging q/m [µC/g] |
|---|---|
| 10 min | −11 |
| 30 min | −17 |
| 2 h | −19 |
| 24 h | −22 |

USE EXAMPLE 22

As described in Use Example 20, 1 part of compound 2a is incorporated and the charge is measured at an atmospheric humidity of 20%.

| Activation time | Charging q/m [µC/g] |
|---|---|
| 10 min | −11 |
| 30 min | −19 |
| 2 h | −22 |
| 24 h | −22 |

USE EXAMPLE 23

As described in Use Example 20, 1 part of compound 2a is incorporated and the charge is measured at an atmospheric humidity of 20%.

| Activation time | Charging q/m [µC/g] |
|---|---|
| 10 min | −14 |
| 30 min | −23 |
| 2 h | −25 |
| 24 h | −26 |

USE EXAMPLE 24

As described in Use Example 20, 1 part of compound 3 is incorporated and the charge is measured at an atmospheric humidity of 90%.

| Activation time | Charging q/m [µC/g] |
|---|---|
| 10 min | −9 |
| 30 min | −15 |
| 2 h | −19 |
| 24 h | −20 |

USE EXAMPLE 25

As described in Use Example 20, 1 part of compound 3 is incorporated and the charge is measured at an atmospheric humidity of 20%.

| Activation time | Charging q/m [µC/g] |
|---|---|
| 10 min | −9 |
| 30 min | −15 |
| 2 h | −18 |
| 24 h | −23 |

USE EXAMPLE 26

As described in Use Example 1, 1 part of compound 2 b is incorporated and the charge is measured at an atmospheric humidity of 40 to 60%.

| Activation time | Charging q/m [µC/g] |
|---|---|
| 10 min | −22 |
| 30 min | −25 |
| 2 h | −27 |
| 24 h | −36 |

USE EXAMPLE 27

As described in Use Example 4, 1 part of compound 2 b is incorporated and the charge is measured at an atmospheric humidity of 40 to 60%.

| Activation time | Charging q/m [µC/g] |
|---|---|
| 10 min | −12 |
| 30 min | −18 |
| 2 h | −24 |
| 24 h | −32 |

USE EXAMPLE 28

As described in Use Example 7, 1 part of compound 2 b is incorporated and the charge is measured at an atmospheric humidity of 40 to 60%.

| Activation time | Charging q/m [µC/g] |
|---|---|
| 10 min | −15 |
| 30 min | −15 |
| 2 h | −16 |
| 24 h | −16 |

USE EXAMPLE 29

As described in Use Example 10, 1 part of compound 2 b is incorporated and the charge is measured at an atmospheric humidity of 40 to 60%.

| Activation time | Charging q/m [µC/g] |
|---|---|
| 10 min | −16 |
| 30 min | −21 |
| 2 h | −22 |
| 24 h | −22 |

USE EXAMPLE 30

As described in Use Example 20, 1 part of compound 2 b is incorporated and the charge is measured at an atmospheric humidity of 90%.

| Activation time | Charging q/m [µC/g] |
|---|---|
| 10 min | −14 |
| 30 min | −22 |
| 2 h | −23 |
| 24 h | −21 |

USE EXAMPLE 31

As described in Use Example 20, 1 part of compound 2 b is incorporated and the charge is measured at an atmospheric humidity of 20%.

| Activation time | Charging q/m [µC/g] |
|---|---|
| 10 min | −13 |
| 30 min | −19 |
| 2 h | −21 |
| 24 h | −22 |

USE EXAMPLE 32

As described in Use Example 1, 1 part of compound 1 is incorporated homogeneously into 99 parts of a powder coating binder formulation comprising:

| | |
|---|---|
| Modified epoxy resin: | 170 parts |
| Carboxyl-terminated polyester: | 397 parts |
| Flow agent: | 30 parts |
| Benzoin: | 3 parts |
| Titanium dioxide: | 300 parts |
| Barium sulfate: | 100 parts |
| | 1000 parts |

To determine the deposition rate, 30 g of the test powder coating are sprayed under a defined pressure by means of a tribo-gun as described above. By obtaining the difference in weight, the amount of powder coating deposited can be determined and a deposition rate in % defined and a current flow (μA) can be measured by the charge transfer.

| Pressure (bar) | Current [μA] | Deposition rate [%] |
|---|---|---|
| 3 | 2.5–3.1 | 82 |

USE EXAMPLE 33

As described in Use Example 32, 1 part of compound 2 a is incorporated and measurements are taken.

| Pressure (bar) | Current [μA] | Deposition rate [%] |
|---|---|---|
| 3 | 2.6–3.2 | 65 |

USE EXAMPLE 34

As described in Use Example 30, 1 part of compound 2 a is incorporated and measurements are taken.

| Pressure (bar) | Current [μA] | Deposition rate [%] |
|---|---|---|
| 3 | 2.6–3.1 | 78 |

COMPARISON EXAMPLE 1

For the measurement using pure styrene/acrylate toner binder (styrene/methacrylate copolymer 60:40), the procedure is as in Use Example 1 but without kneading-in additives (resin blank value). The toner binder is activated with a carrier (carrier 1) which comprises magnetite particles of size 50 to 200 μm coated with styrene/methacrylate copolymer 90:10 (90 μm Xerographic Carrier, Plasma Materials Inc., U.S.A.).

| Activation time | Charging q/m [μC/g] |
|---|---|
| 10 min | −4 |
| 30 min | −12 |
| 2 h | −27 |
| 24 h | −48 |

COMPARISON EXAMPLE 2

For measurement using the pure polyester, the procedure is as in Use Example 1, but without kneading-in any additive (resin blank value). The polyester toner binder (polyester based on bisphenol) is activated with a carrier (carrier 2) which comprises magnetite particles of size 50 to 200 μm coated with silicone (bulk density 2.75 g/cm$^3$).

| Activation time | Charging q/m [μC/g] |
|---|---|
| 10 min | −31 |
| 30 min | −29 |
| 2 h | −24 |
| 24 h | −12 |

COMPARISON EXAMPLE 3

For measurement using the pure styrene/acrylate toner binder (styrene/methacrylate copolymer 60:40), the procedure followed is as in Use Example 1, but without kneading-in additives (resin blank value). The toner binder is activated with a carrier (carrier 3) comprising magnetite particles of size 50 to 200 μm coated with styrene/methacrylate copolymer (bulk density 2.62 g/cm$^3$); (FBM 100 A; Powder Techn.).

| Activation time | Charging q/m [μC/g] |
|---|---|
| 10 min | −7 |
| 30 min | −11 |
| 2 h | −16 |
| 24 h | −22 |

COMPARISON EXAMPLE 4

To determine the deposition rate and the current of the pure powder coating binder formulation having the composition:

| | |
|---|---|
| Modified epoxy resin: | 170 parts |
| Carboxyl-terminated polyester: | 397 parts |
| Flow agent: | 30 parts |
| Benzoin: | 3 parts |
| Titanium dioxide: | 300 parts |
| Barium sulfate: | 100 parts |
| | 1000 parts |

Procedure followed is as in Use Example 32. Measurement gives:

| Pressure (bar) | Current [μA] | Deposition rate d[%] |
|---|---|---|
| 3 | 0.9–1.2 | 28 |

COMPARISON EXAMPLE 5

1 part of a xanthan is homogeneously incorporated into 99 parts of a toner binder (styrene/methacrylate copolymer 60:40) by means of a kneader for 45 min. The mixture is then ground on a laboratory universal mill and subsequently classified on a centrifugal sifter. The desired particle fraction (4 to 25 μm) is activated with a carrier (carrier 3) which comprises magnetite particles of size 50 to 200 μm coated with styrene/methacrylate copolymer (bulk density 2.62 g/cm$^3$); (FBM 100 A; Powder Tech.).

Measurement is carried out on a customary q/m measurement stand. By using a sieve having a mesh width of 25 μm, it is ensured that no carrier is entrained when the toner is blown out. The measurements are made at 50% relative atmospheric humidity. In this case, 2% of toner are measured as a mixture with 98% of carrier 3.

| Activation time | Charging q/m [μC/g] |
|---|---|
| 10 min | −1 |
| 30 min | −3 |
| 2 h | −7 |
| 24 h | −17 |

Characterization of the cyclodextrins employed

Compound 1

The compound is characterized by:

| 1. | Water content [%]; | 8.4 | |
|---|---|---|---|
| 2. | pH: | 7–7.5 | |
| 3. | Conductivity [μS/cm]: | 20 | |
| 4. | Dielectric characteristic data: | | |
| | a) Volume resistivity [ohm × cm]: | $2 \times 10^{12}$ | |
| | b) Dielectric loss factor: | $5 \times 10^{-2}$ | |
| | c) Relative permittivity: | 5 | |
| 5. | Particle size $d_{50}$ [μm]: | 45 μm ($d_{95}$ = 180) | |
| 6. | Heat stability [°C.] (decomp.): | >240 | |
| 7. | Crystallinity: | highly crystalline | |

Compound 2 a

The compound is characterized by:

| 1. | Water content [%]; | 8 |
|---|---|---|
| 2. | pH: | 6.5–7.5 |
| 3. | Conductivity [μS/cm]: | 25 |
| 4. | Dielectric characteristic data: | |
| | a) Volume resistivity [ohm × cm]: | $5 \times 10^{11}$ |
| | b) Dielectric loss factor: | $4 \times 10^{-2}$ |
| | c) Relative permittivity: | 6 |
| 5. | Particle size $d_{50}$ [μm]: | 250 μm ($d_{95}$ = 1400) |
| 6. | Heat stability [°C.] (decomp.): | >240 |
| 7. | Crystallinity: | highly crystalline |

In a particular variant, compound 2 b is characterized by:

| 1. | Water content [%]; | 1.7 |
|---|---|---|
| 2. | pH: | 6.5–7.5 |
| 3. | Conductivity [μS/cm]: | 0.8 |
| 4. | Dielectric characteristic data: | |
| | a) Volume resistivity [ohm × cm]: | $1 \times 10^{10}$ |
| | b) Dielectric loss factor: | $1 \times 10^{-1}$ |
| | c) Relative permittivity: | 9.4 |
| 5. | Particle size $d_{50}$ [μm]: | 30 μm |
| 6. | Heat stability [°C.] (decomp.): | 340 |
| 7. | Crystallinity: | amorphous to X-rays |

Compound 3

The compound is characterized by:

| 1. | Water content [%]; | 7.6 |
|---|---|---|
| 2. | pH: | 6.5–7.5 |
| 3. | Conductivity [μS/cm]: | 29 |
| 4. | Dielectric characteristic data: | |
| | a) Volume resistivity [ohm × cm]: | $4 \times 10^{10}$ |
| | b) Dielectric loss factor: | $4 \times 10^{-2}$ |
| | c) Relative permittivity: | 14 |
| 5. | Particle size $d_{50}$ [μm]: | 180 |
| 6. | Heat stability [°C.] (decomp.): | 272 |
| 7. | Crystallinity: | highly crystalline |

The derivatives (compounds 4 to 10) are prepared in accordance with the specification known from the literature (Chem. Bet. 102 [1969]). in deviation from the specifications, the substances were dried in vacuo at temperatures of between 20° C. and 200° C., preferably between 50° and 150° C. For identification, the melting point known from the literature was used, and a moisture content determination was additionally carried out. The melting points were determined by means of differential thermal analysis at a heating-up rate of 3 K/min (m.p.: melting point, th.: theoretical melting point according to the literature).

| Compound 4: | m.p.: 182° C. | (th.: 175–177° C.) |
|---|---|---|
| | H₂O: 0.87% | |
| Compound 5: | m.p.: 171° C. | (th.: 170–172° C.) |
| | H₂O: 1.7% | |
| Compound 6: | m.p.: 195° C. | (th.: 195° C.) |
| | H₂O: 2.96% | |
| Compound 7: | m.p.: 216 | (th.: 239° C.) |
| | H₂O: 8.0% | |
| Compound 8: | m.p.: 180° C. | (th.: 155° C.) |
| | H₂O: 0.92% | |
| Compound 9: | m.p.: 156° C. | (th.: 155° C.) |
| | H₂O: 0.84% | |
| Compound 10: | m.p.: 148° C. | (th.: 150° C.) |
| | H₂O: 0.31% | |

We claim:

1. A method of providing control over or improving the charge of an electrophotographic toner or developer, of a powder or powder coating which can be sprayed triboelectrically or electrokinetically or of an electret material comprising the step of incorporating into said toner, developer, powder, powder coating or electret material a cyclically linked oligo- or polysaccharide having 3 to 100 monomeric saccharide units as a charge control agent and charging improver.

2. The method as claimed in claim 1, wherein the cyclically linked oligo- or polysaccharide is a 1,4-linked pyranose of the formula (I)

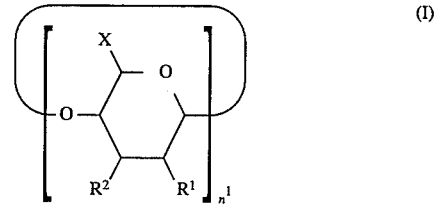

or a 1,6-linked pyranose of the formula (II)

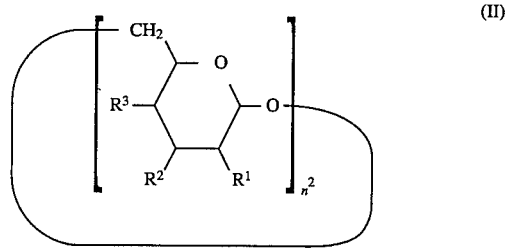

in which n¹ is a number from 6 to 100, n² is a number from 3 to 100,

R¹, R² and R³ independently of one another are identical or different and are radicals selected from the group consisting of hydroxyl; branched or unbranched, cyclic or open-chain $C_1$–$C_{30}$-alkoxy; branched or unbranched, cyclic or open-chain $C_2$–$C_{30}$-alkenoxy, where the alkoxy and alkenoxy radicals mentioned can be partly or completely fluorinated; unsubstituted —O-aryl($C_6$–$C_{30}$), —O-aryl($C_6$–$C_{30}$) which is substituted by 1 to 5 $C_1$–$C_{30}$-alkyl radicals or $C_1$–$C_{30}$-alkoxy radicals; —O—($C_1$–$C_4$)-alkyl-($C_6$–$C_{30}$)aryl; —O—$C_{60}$–$C_{70}$-fullerene; —O-(alkylene($C_0$–$C_{30}$)-Y-alkyl ($C_1$–$C_{30}$))$_x$, —O-(aryl($C_6$–$C_{30}$)-Y-aryl($C_6$–$C_{30}$))$_x$, —O—(aryl($C_6$–$C_{30}$)-Y-alkyl($C_1$–$C_{30}$))$_x$ and —O—(alkylene($C_0$–$C_{30}$)-Y-aryl($C_6$–$C_{30}$)-alkyl($C_0$–$C_4$))$_x$, where x is 1 to 30 and Y is a chemical bond, O, S, SO, $SO_2$, $PR^4$, $PR^4_3$, Si, $SiR^4_2$ or $NR^4$, and the radicals $R^4$ are hydrogen, $C_1$–$C_4$-alkyl, $C_1$–$C_4$-alkoxy, —O—($C_2$–$C_3$)-alkylene-O)$_x$—$R^5$, in which $R^5$ is hydrogen, $C_1$–$C_4$-alkyl, acetyl, benzoyl or naphthoyl; a —O—$COR^6$ radical, in which $R^6$ is OH, saturated or unsaturated, branched or unbranched, cyclic or open-chain $C_1$–$C_{18}$-alkyl, partly fluorinated or perfluorinated ($C_1$–$C_{18}$)-alkyl, phenyl or $C_1$–$C_{18}$-alkyl-phenyl;

a —O—$PR^7_2$ and —O—$PR^7_4$ radical in which $R^7$ is hydrogen, methyl, ethyl, propyl, butyl, vinyl, allyl, isopropyl, isobutyl, neopentyl, tert-butyl, cyclohexyl, cyclopentyl, phenyl, tolyl, benzyl, partly fluorinated or perfluorinated alkyl-($C_1$–$C_{18}$), O, OH, S or $NR^8_2$, in which $R^8$ is hydrogen, $C_1$–$C_8$-alkyl or phenyl; an —O—$SO_2R^9$ radical, in which $R^9$ is methyl, ethyl, propyl, butyl, vinyl, allyl, isopropyl, isobutyl, neopentyl, tert-butyl, cyclohexyl, cyclopentyl, phenyl, tolyl, benzyl, partly fluorinated or perfluorinated alkyl-($C_1$–$C_{18}$), O, $OR^8$, S or $NR^8_2$;

an —O—$SiR^{10}_3$ radical in which $R^{10}$ is methyl, ethyl, propyl, butyl, vinyl, allyl, isopropyl, isobutyl, neopentyl, tert-butyl, cyclohexyl, cyclopentyl, phenyl, tolyl, partly fluorinated or perfluorinated alkyl($C_1$–$C_{18}$), O, $OR^8$, S or $NR^8_2$;

an —O—$BR^{11}_2$ radical, in which $R^{11}$ is methyl, ethyl, propyl, butyl, vinyl, allyl, isopropyl, isobutyl, neopentyl, tert-butyl, cyclohexyl, cyclopentyl, phenyl, tolyl, partly fluorinated or perfluorinated alkyl($C_1$–$C_{18}$), O, OH, $OR^8$, S or $NR^8_2$;

an amino radical of the formula —$NH_2$, —$NR^{12}$ or —$NR^{12}$, in which $R^{12}$ is hydrogen, or a radical of a $C_1$–$C_{30}$-aliphatic, $C_7$–$C_{60}$-araliphatic or $C_6$–$C_{30}$-aromatic hydrocarbon, which can be interrupted by one to 3 hetero atoms, N, O, S or a combination thereof; an alkyl($C_1$–$C_{18}$), which is perfluorinated or partly fluorinated; or the N atom of the amino radical is a constituent of a saturated or unsaturated, aromatic or non-aromatic 5- to 7-membered ring system, which optionally contains the further hetero atoms nitrogen, oxygen, sulfur or a combination thereof in the ring, and which is optionally fused on or bridged to further ring systems;

an ammonium radical —$NR^{12}_4{}^+A^-$, in which $A^-$ is an inorganic or organic anion;

an azide radical —$N_3$;

or in which the radicals $R^1$ and $R^2$, or $R^2$ and $R^3$ together form a ring system of the formula

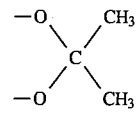

and

X is —$CH_2R^1$, —$CH_2$—$NO_2$ or —$CH_2$—Hal, in which Hal is halogen.

3. The method as claimed in claim 2, wherein n¹ is a number from 6 to 80, and n² is a number from 3 to 60.

4. The method as claimed in claim 2, wherein n¹ is a number from 6 to 60, and n² is a number from 3 to 60.

5. The method as claimed in claim 2, wherein

R¹, R² and R³ independently of one another are hydroxyl, methoxy, ethoxy, propyloxy, iso-propyloxy, n-butyloxy, iso-butyloxy, tert-butyloxy, vinyloxy, allyloxy, phenoxy, benzyloxy, —O—$CF_3$, —O—($CH_2CH_2$—O)$_x$—$R^5$ or —O—$COR^{13}$, in which $R^{13}$ is a $C_1$–$C_8$-alkyl, phenyl or $C_1$–$C_8$-alkyl-phenyl;

or an amino group —$NR^{14}R^{15}$, in which $R^{14}$ and $R^{15}$ independently of one another are hydrogen, methyl, ethyl, n-propyl, iso-propyl, n-butyl, iso-butyl, tert-butyl, allyl, vinyl, phenyl, benzyl or tolyl, or in which the N atom is a constituent of a piperidinyl, morpholinyl, pyridinium or quinolinium ring system;

or an amino group —$N^\oplus HR^{14}R^{15}A'^\beta$, in which $A'^\beta$ is a borate, sulfate, chloride, bromide, nitrate, cyanide, phosphate, carbonate, acetate or alcoholate anion and X is —$CH_2OH$, —$CH_2OCH_3$, —$CH_2Cl$, —$CH_2Br$, —COOH, —$COOCH_3$, —$CH_2$—O—$C(C_6H_5)_3$, —$CH_2$—O—$Si(CH_3)_3$, —$CH_2$—O—$SO_2$—$CH_3$ or —$CH_2$—O—$SO_2$—$C_6H_4CH_3$.

6. The method as claimed in claim 2, wherein the cyclically linked oligo- or polysaccharide comprises in each case identical or enantiomeric saccharide units or an enantiomer mixture of these units, in which the radicals R¹, R², R³ and X in each case have the same meaning.

7. The method as claimed in claim 1, wherein a mixture or a mixed crystal of various cyclically linked oligo- or polysaccharide is employed.

8. The method as claimed in claim 2, wherein the cyclically linked oligosaccharide is a 1,4-linked oligoglucoside having 6 to 8 monomeric units, in which R¹, R² and R³ are in each case OH, $OCH_3$, $OC_2H_5$, $OC_3H_7$, O-n-butyl, O-isobutyl, O-tert-butyl, O-mesyl or O-tosyl and X is —$CH_2OH$, —$CH_2OCH_3$, —$CH_2O$-tosyl or —$CH_2O$-mesyl.

9. The method as claimed in claim 8, wherein R¹ and R² are each OH, X is $CH_2OH$ and the number cyclically linked of glucose units is 6, 7 or 8.

10. An electrophotographic toner comprising a customary toner binder and 0.01 to 50% by weight of at least one cyclically linked oligo- or polysaccharide as claimed in claim 1.

11. An electrophotographic toner comprising a customary toner binder and 0.1 to 5% by weight of at least one cyclically linked oligo- or polysaccharide as claimed in claim 1.

12. A process for the preparation of an electrophotographic toner as claimed in claim 10, which comprises homogeneously incorporation the cyclically linked oligo- or polysaccharide into the toner binder.

13. A powder or powder coating comprising a polyester or acrylic resin containing epoxide, carboxyl or hydroxyl groups or a combination thereof and 0.01 to 50% by weight of at least one cyclically linked oligo- or polysaccharide as claimed in claim 1.

14. A powder or powder coating comprising a polyester or acrylic resin containing epoxide, carboxyl or hydroxyl groups or a combination thereof and 0.1 to 5% by weight of at least one cyclically linked oligo- or polysaccharide as claimed in claim 1.

15. A process for the preparation of a powder or powder coating as claimed in claim 13, which comprises homogeneously incorporating the cyclically linked oligo- or polysaccharide into the resin.

* * * * *